United States Patent
Li

(10) Patent No.: US 11,234,410 B2
(45) Date of Patent: Feb. 1, 2022

(54) PET LITTER HAVING AN ACTIVATED CARBON LAYER AND METHODS OF MAKING THE LITTER

(71) Applicant: NESTEC SA, Vevey (CH)

(72) Inventor: James Li, Frontenac, MO (US)

(73) Assignee: SOCIÉTÉ DES PRODUITS NESTLÉ S.A., Vevey (CH)

(*) Notice: Subject to any disclaimer, the term of this patent is extended or adjusted under 35 U.S.C. 154(b) by 620 days.

(21) Appl. No.: 16/193,113

(22) Filed: Nov. 16, 2018

(65) Prior Publication Data

US 2019/0150396 A1  May 23, 2019

Related U.S. Application Data

(60) Provisional application No. 62/588,648, filed on Nov. 20, 2017.

(51) Int. Cl.

| | | |
|---|---|---|
| *A01K 1/015* | (2006.01) | |
| *B01J 20/10* | (2006.01) | |
| *B01J 20/12* | (2006.01) | |
| *B01J 20/20* | (2006.01) | |
| *B01J 20/28* | (2006.01) | |

(Continued)

(52) U.S. Cl.
CPC .......... *A01K 1/0155* (2013.01); *A01K 1/0152* (2013.01); *A01K 1/0154* (2013.01); *B01J 20/106* (2013.01); *B01J 20/12* (2013.01); *B01J 20/20* (2013.01); *B01J 20/2803* (2013.01); *B01J 20/3028* (2013.01); *B01J 20/3042* (2013.01);

(Continued)

(58) Field of Classification Search
CPC ... A01K 1/0155; A01K 1/0152; A01K 1/0154
See application file for complete search history.

(56) References Cited

U.S. PATENT DOCUMENTS

| | | | |
|---|---|---|---|
| 5,860,391 | A | 1/1999 | Maxwell et al. |
| 7,603,964 | B2 | 10/2009 | Jenkins et al. |

(Continued)

FOREIGN PATENT DOCUMENTS

| | | |
|---|---|---|
| CA | 2546538 | 11/2007 |
| CA | 2607750 | 5/2008 |

(Continued)

OTHER PUBLICATIONS

International Search Report and Written Opinion to PCT/IB18/059055 dated Jan. 7, 2019.

*Primary Examiner* — Monica L Barlow

(57) ABSTRACT

A method of making absorbent granules can include mixing activated carbon with a liquid and a binder to form a slurry; applying the slurry to particles of absorbent core material to at least partially coat the particles of the core material with a first distinct layer containing the activated carbon; and applying a clumping agent to the first distinct layer to at least partially coat the first distinct layer with a second distinct layer containing the clumping agent. The absorbent granules can be used as a deodorizer and/or a pet litter, and each of the absorbent granules can include an absorbent core, a first distinct layer containing activated carbon, and a second distinct layer containing a clumping agent such that the first distinct layer is between an outer surface of the absorbent core and an inner surface of the second distinct layer.

18 Claims, 1 Drawing Sheet

◐ Core material (e.g. clay or expanded perlite)
● Activated carbon
○ Clumping agent (e.g. sodium bentonite)

(51) Int. Cl.
  *B01J 20/30* (2006.01)
  *B01J 20/32* (2006.01)
(52) U.S. Cl.
  CPC ......... *B01J 20/3204* (2013.01); *B01J 20/324* (2013.01); *B01J 20/3293* (2013.01)

(56) References Cited

U.S. PATENT DOCUMENTS

| | | |
|---|---|---|
| 7,964,529 B2 | 6/2011 | Borgese et al. |
| 8,268,018 B2 | 9/2012 | Privitera et al. |
| 9,253,961 B2 | 2/2016 | Fritter et al. |
| 9,283,540 B2 | 3/2016 | Fritter et al. |
| 9,648,845 B2 | 5/2017 | Fritter et al. |
| 2003/0148100 A1* | 8/2003 | Greene ................ A01K 1/0155 428/403 |
| 2005/0005870 A1 | 1/2005 | Fritter et al. |
| 2007/0017453 A1* | 1/2007 | Fritter ................ A01K 1/0154 119/173 |
| 2007/0289543 A1 | 12/2007 | Petska et al. |
| 2008/0184939 A1 | 8/2008 | Fritter et al. |
| 2009/0217882 A1* | 9/2009 | Jenkins ................ B01J 20/2803 119/173 |
| 2010/0006035 A1* | 1/2010 | Spittle ................ A01K 1/0152 119/172 |
| 2011/0061598 A1* | 3/2011 | Boxley ................ A01K 1/0154 119/173 |
| 2013/0177620 A1 | 7/2013 | Jenkins et al. |
| 2015/0040833 A1* | 2/2015 | Kornmayer .............. B05D 1/34 119/173 |
| 2020/0329661 A1* | 10/2020 | Li ........................ B01J 20/3236 |

FOREIGN PATENT DOCUMENTS

| | | |
|---|---|---|
| WO | 1990009099 | 8/1990 |
| WO | 1991012030 | 8/1991 |

* cited by examiner

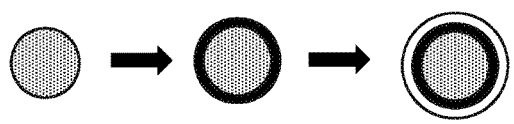
Core material (e.g. clay or expanded perlite)
Activated carbon
Clumping agent (e.g. sodium bentonite)

PET LITTER HAVING AN ACTIVATED CARBON LAYER AND METHODS OF MAKING THE LITTER

CROSS REFERENCE TO RELATED APPLICATIONS

This application claims priority to U.S. Provisional Application Ser. No. 62/588,648 filed Nov. 20, 2017, the disclosure of which is incorporated in its entirety herein by this reference.

FIELD OF THE INVENTION

The present disclosure relates generally to absorbent granules containing activated carbon that can be used as a clumping pet litter and/or as a deodorizer. More specifically, the present disclosure is directed to absorbent granules comprising a layer of activated carbon between an absorbent core and a layer of clumping agent and methods for making and using such absorbent granules.

BACKGROUND

Litter boxes are used by pets such as cats for elimination of urine and fecal matter. A litter box contains a layer of pet litter that receives the urine and fecal matter. The pet litter is granular, absorbent and either clumping or non-clumping. A clumping pet litter is a litter product in which the granules facilitate formation of clumps after the urine and fecal matter is deposited in the pet litter. The clumps are typically sifted from the litter box using a litter scoop and then discarded. Non-clumping pet litter is typically good at absorbing urine and thus removing urine odors, but replacing soiled non-clumping pet litter without emptying the entire box of litter can be difficult.

Activated carbon is an absorbent for odors and can be added to pet litter to control odors by two known methods. First, activated carbon can be added directly into litter as carbon granules. The problem with this method is segregation of the activated carbon and the litter. Granular activated carbon normally has a significant amount of black dust. Additionally, activated carbon is a black material and thus reduces product appeal to consumers.

Second, an agglomeration method can be used to enclose activated carbon in pet litter. In this method, bentonite, clay, filler and activated carbon powder are dry mixed and then agglomerated in pin mixers to produce pet litter comprising the carbon material. One problem with this method is that uniformly mixing activated carbon powder with bentonite powder at a large scale is difficult. Furthermore, the activated carbon is deeply embedded in the litter structure. Consequently, the volatile compounds from the urine and fecal matter must go through a torturous path to reach the activated carbon, thereby reducing the efficacy of the activated carbon. Additionally, the black color of the activated carbon cannot be mitigated when carbon addition level is high.

SUMMARY

The present inventors surprisingly found that odor control performance of absorbent granules used in clumping pet litter could be improved by incorporating an activated carbon layer between an absorbent core and a coating layer of clumping agent (e.g., bentonite). This method of introducing activated carbon in absorbent granules effectively hides the black color of the activated carbon, while improving the odor control performance of the granules. This method can be easily integrated into current manufacturing processes.

Accordingly, in a general embodiment, the present disclosure provides a method of making absorbent granules. The method comprises: mixing activated carbon with a liquid and a binder to form a slurry; applying the slurry to particles of absorbent core material to at least partially coat the particles of the absorbent core material with a first distinct layer comprising the activated carbon; and applying a clumping agent to the first distinct layer to at least partially coat the first distinct layer with a second distinct layer comprising the clumping agent. In another embodiment, the present disclosure provides a clumping pet litter comprising absorbent granules made by this method. In another embodiment, the present disclosure provides a deodorizer comprising absorbent granules made by this method.

In an embodiment, the method further comprises drying the absorbent granules to form dried granules. The method can further comprise separating a portion of the dried granules from the remainder of the dried granules, the portion has sizes within a predetermined size range. The method can further comprise using the dried particles as at least a portion of a deodorizer or a clumping pet litter.

In an embodiment, the clumping agent comprises sodium bentonite, and the second distinct layer consists essentially of the sodium bentonite.

In an embodiment, the first distinct layer consists essentially of the activated carbon.

In an embodiment, the absorbent core material consists essentially of at least one of a clay or expanded perlite.

In an embodiment, the second distinct layer is an outermost layer of the absorbent granules.

In an embodiment, the absorbent core material is an agglomerate that comprises clay and is substantially free of activated carbon and substantially free of bentonite.

In an embodiment, the binder comprises a hydrocolloid.

In an embodiment, at least one step selected from the group consisting of the applying of the slurry to the particles of the absorbent core material and the applying of the clumping agent to the first distinct layer is performed in a rotary coating machine.

In an embodiment, the method comprises first mixing the binder in the liquid to form a solution and then adding a powder comprising the activated carbon to the solution with stirring to produce the slurry.

In an embodiment, the clumping agent is applied to the first distinct layer as a powder.

In another embodiment, the present disclosure provides absorbent granules each comprising an absorbent core, a first distinct layer comprising activated carbon, and a second distinct layer comprising a clumping agent. The first distinct layer is between an outer surface of the absorbent core and an inner surface of the second distinct layer.

In an embodiment, the first distinct layer abuts the outer surface of the absorbent core and abuts the inner surface of the second distinct layer.

In an embodiment, the clumping agent comprises sodium bentonite, and the second distinct layer consists essentially of the sodium bentonite.

In an embodiment, the first distinct layer consists essentially of the activated carbon.

In an embodiment, the absorbent core consists essentially of at least one of a clay or expanded perlite.

In an embodiment, the second distinct layer is an outermost layer of the absorbent granules.

In an embodiment, the absorbent core is an agglomerate that comprises clay and is substantially free of activated carbon and substantially free of bentonite.

In an embodiment, the absorbent granules further comprise a binder that adheres the activated carbon to the absorbent core.

In another embodiment, the present disclosure provides a clumping pet litter comprising at least one of (i) absorbent granules made by the method disclosed herein or (ii) the absorbent granules described herein.

In another embodiment, the present disclosure provides a method of reducing malodor from animal waste. The method comprises using a clumping pet litter in a litter box, the clumping pet litter comprising absorbent granules each comprising an absorbent core, a first distinct layer comprising activated carbon, and a second distinct layer comprising a clumping agent, the first distinct layer is between an outer surface of the absorbent core and an inner surface of the second distinct layer.

In another embodiment, the present disclosure provides a method of reducing malodor from animal waste. The method comprises adding a deodorizer to a pet litter in a litter box, the pet litter having a different formulation than the deodorizer, the deodorizer comprising absorbent granules each comprising an absorbent core, a first distinct layer comprising activated carbon, and a second distinct layer comprising a clumping agent, the first distinct layer is between an outer surface of the absorbent core and an inner surface of the second distinct layer.

In another embodiment, the present disclosure provides a method of reducing malodor. The method comprising positioning a deodorizer in a location comprising a substance creating the malodor, the deodorizer comprising absorbent granules each comprising an absorbent core, a first distinct layer comprising activated carbon, and a second distinct layer comprising a clumping agent, the first distinct layer is between an outer surface of the absorbent core and an inner surface of the second distinct layer.

An advantage of one or more embodiments provided by the present disclosure is to provide improved deodorizers and clumping pet litters. Another advantage of one or more embodiments provided by the present disclosure is to provide methods of making improved deodorizers and clumping pet litters. A further advantage of one or more embodiments provided by the present disclosure is to incorporate carbon in clumping pet litter allowing improved product performance in odor control, without reducing litter appeal to consumers. Still another advantage of one or more embodiments provided by the present disclosure is to incorporate carbon into a current clumping pet litter without significantly changing processing. Yet another advantage of one or more embodiments provided by the present disclosure is to incorporate a high level of activated carbon without dramatically changing the brightness of the clumping pet litter; for example, the brightness of litter comprising 3 wt. % carbon can be at least 80% of the brightness shown by the litter lacking carbon as an odor control enhancement additive. Another advantage of one or more embodiments provided by the present disclosure is a clumping pet litter with an appearance very similar to a clumping pet litter lacking carbon, but nevertheless showing improved odor control performance. A further advantage of one or more embodiments provided by the present disclosure is improved integrity and strength of litter particles due to a binder.

Still another advantage of one or more embodiments provided by the present disclosure is a clumping pet litter in which carbon is not deeply buried in the litter structure and thus is closer to the surface of the granule, thus more quickly absorbing surrounding malodors and having a performance advantage relative to known clumping pet litters in which carbon is one of several agglomerated materials. Another advantage of one or more embodiments provided by the present disclosure is a clumping pet litter containing activated carbon and sodium bentonite that is made without dry blending the activated carbon with the sodium bentonite and/or without using a tumbler/growth agglomeration method. A further advantage of one or more embodiments provided by the present disclosure is a clumping pet litter having a dense bentonite surface layer that allows low dust and minimal tracking for the litter. Still another advantage of one or more embodiments provided by the present disclosure is a clumping pet litter having a layered structure in which each layer can provide a more enhanced function relative to when it is used in an agglomerated litter; for example, an outer bentonite layer can mainly provide clumping properties, a middle carbon layer can provide enhanced odor control performance, and a core can provide water absorption properties. Another advantage of one or more embodiments provided by the present disclosure is a reduced amount of bentonite in litter because the bentonite layer is coated on a layer of activated carbon which is coated on a core free of bentonite, thereby allowing production of the litter at a lower cost. A further advantage of one or more embodiments provided by the present disclosure is to avoid carbon particles on the outer surface of the litter because such particles not only make the product darker but also may also reduce clumping cohesion (strength).

Additional features and advantages are described herein and will be apparent from the following Detailed Description and the Figures.

BRIEF DESCRIPTION OF THE FIGURES

FIG. 1 is an illustration of layered absorbent granules having an absorbent core, a first distinct layer and a second distinct layer.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the singular forms "a," "an" and "the" include plural referents unless the context clearly dictates otherwise. Thus, for example, reference to "a material" or "the material" includes two or more materials.

The words "comprise," "comprises" and "comprising" are to be interpreted inclusively rather than exclusively. Likewise, the terms "include," "including" and "or" should all be construed to be inclusive, unless such a construction is clearly prohibited from the context.

However, the compositions disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. "Consisting essentially of" means that the embodiment comprises more than 50 wt. % of the identified components, at least 75 wt. % of the identified components, at least 85 wt. % of the identified components, or at least 95 wt. % of the identified components, for example at least 99 wt. % of the identified components.

The term "and/or" used in the context of "X and/or Y" should be interpreted as "X," or "Y," or "both X and Y." Similarly, "at least one of X or Y" should be interpreted as "X," or "Y," or "both X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

All percentages expressed herein are by weight of the total weight of the composition unless expressed otherwise. As used herein, "about," "approximately" and "substantially" are understood to refer to numbers in a range of numerals, for example the range of −10% to +10% of the referenced number, within −5% to +5% of the referenced number, within −1% to +1% of the referenced number, or within −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The terms "pet" and "animal" are used synonymously herein and mean any animal which can use a litter box, non-limiting examples of which include a cat, a dog, a rat, a ferret, a hamster, a rabbit, an iguana, a pig or a bird. The pet can be any suitable animal, and the present disclosure is not limited to a specific pet animal. The term "elimination" means urination and/or defecation by a pet.

As used herein, the term "litter" means any substance that can absorb animal urine and/or decrease odor from animal urine and/or feces. A "clumping litter" forms aggregates in the presence of moisture, the aggregates distinct from the other litter in the litter box. A "clumping agent" binds adjacent particles when wetted. A "non-clumping litter" does not form distinct aggregates. The term "deodorizer" means any substance that absorbs at least a portion of surrounding malodors.

The term "litter box" means any apparatus that can hold pet litter, for example a container with a bottom wall and one or more side walls, and/or any apparatus configured for litter to be positioned thereon, for example a mat or a grate. As a non-limiting example, a litter box may be a rectangular box having side walls that have a height of at least about six inches.

The term "mesh" is defined by the ASTM E-11 U.S.A. standard specification for sieves. As used herein, "size" of a particle refers to the length of the longest dimension of the particle.

The methods and devices and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, exemplary devices, methods, articles of manufacture, or other means or materials are described herein.

EMBODIMENTS

An aspect of the present disclosure is a method of making absorbent granules. The method can comprise mixing one or more binders in a liquid (e.g. water) to produce a solution with a predetermined viscosity, such as about 10 to about 2000 centipoise (cP), about 10 to 750 cP, about 10 to 500 cP, about 10 to 250 cP, or about 10 to 100 cP. The viscosity is typically measured using a viscometer, such as a BROOKFIELD DV-II+ viscometer at ambient temperature (e.g. 25° C.). Then, powdered activated carbon can be added to the binder solution with vigorous stirring, e.g., 3000 rpm in a blender, to produce a slurry that comprises activated carbon particles. Activated carbon is typically available in the form of extremely fine, dusty particles (e.g., 0.1-300 microns) having large surface areas (about 200 to 2000 $m^2/g$).

The slurry can be added to particles of an absorbent core material (e.g., clay or expanded perlite) in a coating device such as a rotary coater, in some instances without further addition of water, to at least partially coat the absorbent core with the activated carbon. In an embodiment, the activated carbon completely coats the absorbent core such that the entirety of the outer surface of the absorbent core is covered with the activated carbon. In some instances the rotary coater is a high-speed rotary coating machine, e.g., operating at 100-2,000 rpm, such as about 800 rpm.

The entirety of the outer surface of the absorbent core material that is covered with the activated carbon comprises from about 60-100% of the outer surface of the absorbent core material that is covered, from about 80-100% of the outer surface of the absorbent core material that is covered, from about 85-100% of the outer surface of the absorbent core material that is covered, from about 90-100% of the outer surface of the absorbent core material that is covered, from about 95-100% of the outer surface of the absorbent core material that is covered, from about 97-100% of the outer surface of the absorbent core material that is covered, from about 98-100% of the outer surface of the absorbent core material that is covered, from about 99-100% of the outer surface of the absorbent core material that is covered, about 100% of the outer surface of the absorbent core material that is covered, from about 90-98% of the outer surface of the absorbent core material that is covered, from about 90-95% of the outer surface of the absorbent core material that is covered, or from about 95-98% of the outer surface of the absorbent core material that is covered.

Then a clumping agent (e.g., sodium bentonite powder) can be applied (e.g. in the same coating device) to at least partially coat the layer of activated carbon. In an embodiment, the clumping agent completely coats the activated carbon layer such that the entirety of the outer surface of the activated carbon layer is covered with the clumping agent.

The entirety of the outer surface of the activated carbon layer that is covered with the clumping agent comprises from about 80-100% of the outer surface of the activated carbon layer that is covered, from about 85-100% of the outer surface of the activated carbon layer that is covered, from about 90-100% of the outer surface of the activated carbon layer that is covered, from about 95-100% of the outer surface of the activated carbon layer that is covered, from about 97-100% of the outer surface of the activated carbon layer that is covered, from about 98-100% of the outer surface of the activated carbon layer that is covered, from about 99-100% of the outer surface of the activated carbon layer that is covered, about 100% of the outer surface of the activated carbon layer that is covered, from about 90-98% of the outer surface of the activated carbon layer that is covered, from about 90-95% of the outer surface of the activated carbon layer that is covered, or from about 95-98% of the outer surface of the activated carbon layer that is covered.

The absorbent granules coated with activated carbon and then clumping agent can be subjected to drying to remove moisture without substantial damage to the material. For example, the granules coated with activated carbon and then clumping agent can be transferred to a dryer such as a fluidized bed dryer. The resultant moisture level can be about 0.5% to about 12%, about 1% to about 11%, about 2% to about 10%, about 3% to about 9%, about 4% to about 8%, about 5% to about 9%, about 6% to about 9%, or about 7% to about 9%. In one embodiment, the moisture level is about 8%.

A non-limiting example of a suitable binder includes starch (e.g., pre-gelled cereal starch) such as a cereal starch from one or more of rice, millet, wheat, corn or oats. Other non-limiting examples of suitable binders include other hydrocolloids such as xanthan, guar gum, locust bean gum, gum karaya, gum tragacanth, gum Arabic, cellulose and its derivatives (e.g. carboxymethylcellulose and methyl hydroxyethyl cellulose), alginate, pectin, carrageenan, gelatin, gellan, agar. Other non-limiting examples of suitable binders include polymeric binders such as polyvinyl alcohol, polyacrylamides, polyacrylates, polyethylene glycol, polyvinyl acrylates, polyurethane, and latex. Inorganic binders such as sodium silicate, bentonite, clay, lime, or cement can also be used for the present disclosure. In some embodiments, the amount of binder is from about 0.02 wt. % to about 5 wt. % relative to the absorbent granules. The exact amount of binder required for processing depends on the binder and its characteristics. In some embodiments, less binder may be needed as the viscosity of the binder increases.

In an embodiment, a portion of the dried granules having a desired size are separated from the other granules. One or more sieves can be used to obtain the granules having a desired size by separating the granules having the desired size from the remainder of the granules. In some embodiments the granules have a size from about −8 mesh to +40 mesh US sieve sizes, i.e., at least 90% of the granules will pass through a 8 mesh US sieve sizes and be retained by a 40 mesh US sieve sizes. In some embodiments, the granules are not evenly distributed within the size range. Commercially available shaker screens may be utilized.

Another aspect of the present disclosure is a clumping pet litter comprising absorbent granules made by any of the methods disclosed herein. Yet another aspect of the present disclosure is a deodorizer comprising absorbent granules made by any of the methods disclosed herein.

In one embodiment the absorbent granules have a layered structure comprising a core and at least two distinct layers covering the core. In another embodiment, the absorbent granules have a layered structure with a core and only two distinct layers. FIG. 1 shows a non-limiting example of an absorbent granule with a core and two distinct layers, a clay core, an activated carbon layer, and a clumping agent layer (e.g. sodium bentonite). The distinct layers according to the present disclosure are visually distinct such that a boundary between adjacent layers can be visually observed with a microscope.

This structure is extremely difficult, if not impossible, to achieve economically using a pin-mixer or tumbling method. Typically, in the pin-mixer and tumbling methods, all ingredients are combined simultaneously into the mixer or tumbler. The ingredients are then sprayed with water to agglomerate the fine particles. Large amounts of dust often coexist with product granules. Additionally, pin mixers and tumblers are typically operated at low speed (e.g. 30 or 60 rpm), resulting in material that is loosely agglomerated.

In contrast, in some embodiments of the methods disclosed herein, materials are added sequentially to the coating device and the coating device is operated at high speed, for example, 160 rpm, 500 rpm or higher. Non-limiting examples of devices that can be utilized to coat the absorbent core particles with the slurry comprising the activated carbon and then apply another coating that comprises the clumping agent include a fluidized bed dryer, a semi-continuous centrifugal coater, and a rotary coating and drying system.

In an embodiment, the amount of the core material is from about 10 wt. % to about 85 wt. % of the absorbent granule, for example from about 20 wt. % to about 70 wt. % or from about 25 to 60 wt. % of the absorbent granule. In one embodiment the core material is substantially free of activated carbon, i.e., less than about 5.0 wt. % activated carbon, less than about 1.0 wt. % activated carbon, less than about 0.2 wt. % activated carbon (relative to the total weight of the absorbent core). In another embodiment, the core material is completely free of activated carbon. In one embodiment, the core is an agglomerated material and is completely free of activated carbon. In some embodiments the core material is substantially free of clumping agent, i.e., less than 5.0 wt. % clumping agent, less than 1.0 wt. % clumping agent, less than 0.1 wt. % clumping agent (relative to the total weight of the absorbent core). In another embodiment, the core material is completely free of clumping agent. In one embodiment, the core is an agglomerated core and is completely free of clumping agent. In another embodiment, the core is substantially free of activated carbon and substantially free of clumping agent.

In an embodiment, the absorbent core comprises, consists essentially of, or consists of expanded perlite. Perlite is a generic term for a naturally occurring siliceous rock. One feature which sets perlite apart from other volcanic glasses is that perlite heated to a suitable point in its softening range expands from four to twenty times the original volume. This expansion is due, at least in part, to the presence of two to six percent combined water in the crude perlite rock. Firing, i.e., quickly heating to above 1,600° F. (871° C.), causes the crude rock to pop in a manner similar to popcorn yielding a very open, highly porous structure referred to as expanded perlite. The density of the expanded perlite can be from about 5 to about 25 lb/ft$^3$ or from about 5 to about 15 lb/ft$^3$. The use of expanded perlite as the core material may provide absorbent granules suitable for use as a low density clumping litter, for example, absorbent granules having a density of about 15 lb/ft$^3$ to about 50 lb/ft$^3$, about 18 lb/ft$^3$ to about 40 lb/ft$^3$, about 20 lb/ft$^3$ to about 30 lb/ft$^3$, or about 25 lb/ft$^3$.

In another embodiment, the absorbent core comprises, consists essentially of, or consists of one or more clays. Non-limiting examples of suitable clays include non-swelling clays, swelling clays, and combinations thereof. At least a portion of the one or more clays can be clays obtained directly by mining natural clay deposits, synthetic clays, or clays that are derived from the agglomeration of clay particles, e.g., clay particles produced by litter manufacturing or other manufacturing processes that involve the use of clays.

Non-swelling clays include kaolinites, illites, ventriculites, attapulgites, sepiolites, and non-swelling smectites. In some embodiments, the non-swelling clays are rich in the following clay minerals: palygorskite-sepiolite, kaolinite, dickite, nacrite, illite, glauconite, celadonite, and phengite. In some embodiments, the non-swelling clays comprise the clay minerals Ca-montmorillonite, kaolinite, and illite.

Swelling clays include smectites and swelling forms of kaolinites, illites, and vermiculites. In some embodiments, the swelling clays contain one or more of hectorite, beidellite, montmorillonite, nontronite, saponite, sauconite, vermiculite, and halloysite.

When used in combination, non-swelling and swelling clays can be mixed in any amount suitable for forming the absorbent core of the granule. Generally, the non-swelling and swelling clays can be mixed in amounts from about 10 to about 90 wt. % non-swelling clay and from about 90 to about 10 wt. % swelling clay (relative to the total weight of the absorbent core).

If the absorbent core is a clay particle, it will typically include at least one clay that is not bentonite. Nevertheless, in some embodiments the absorbent granules can have an absorbent core comprising bentonite, and the core is coated with activated carbon and then additional bentonite.

Regardless of the core material, the particles of the core material can have a desired size. One or more sieves can be used to obtain the absorbent core particles having a desired size by separating the particles having the desired size from the remainder of the particles. In some embodiments the particles of the absorbent core material have a size from about −4 to 60 mesh U.S. sieve size. In some embodiments the particles of the absorbent core material have a size from about −8 to about 30 mesh U.S. sieve size. In some embodiments, the absorbent core particles are not evenly distributed within the size range. Commercially available shaker screens may be utilized. The activated carbon in the layer between the absorbent core and the clumping agent layer can be produced from carbonaceous source materials such as bamboo, coconut husk, willow peat, wood, coir, lignite, coal, and petroleum pitch. For example, physical activation can be used to produce the activated carbon, such as by carbonization in which material with carbon content is pyrolyzed at a temperature from 600 to 900° C., in an inert atmosphere with a gas (e.g., argon or nitrogen), or by activation and oxidation in which a raw material or an already carbonized material is exposed to an oxidizing atmosphere of oxygen or steam at a temperature above 250° C., such as 600-1200° C. As another example, chemical activation can be used to produce the activated carbon, such as by impregnating a raw material with an acid, a strong base, or a salt (e.g., phosphoric acid, potassium hydroxide, sodium hydroxide, calcium chloride, or zinc chloride) and then carbonizing the impregnated material at a lower temperature of 450-900° C.

In one embodiment, the activated carbon layer consists essentially of activated carbon. In another embodiment, the amount of the activated carbon is from about 0.1 wt. % to about 10.0 wt. % of the absorbent granule, from about 0.2 wt. % to about 5 wt. %, or from about 0.3 wt. % to 3 wt. % of the absorbent granule.

The powdered activated carbon is typically available in the form of extremely fine, dusty particles. In one embodiment, the activated carbon has a particle size of about 0.01 to about 300 microns, about 0.1 to about 250 microns, about 0.1 to about 200 microns, about 0.1 to about 150 microns, about 0.1 to about 100 microns, or about 0.1 to about 50 microns. In another embodiment, the activated carbon has a specific surface area of about 200 to about 3,000 m$^2$/g, or about 200 to about 2,000 m$^2$/g, or about 200 to about 15.00 m$^2$g$^{-1}$. In another embodiment, the activated carbon has a pore volume of about 0.1 to about 2.0 cm$^3$ g$^{-1}$, about 0.1 to about 1.0 cm$^3$ g$^{-1}$, about 0.1 to about 0.7 cm$^3$ g$^{-1}$, or about 0.1 to about 0.5 cm$^3$ g$^{-1}$.

The amount of activated carbon relative to core material can be in the range from about 0.3% to about 20%. The amount may vary according to the density of the core materials and relative amount of activated carbon in granules. When expanded perlite is used as the core material the amount of activated carbon to core material can be from about 1 wt. % to about 20 wt. %. When clay is used as the core material the amount of activated carbon to core material can be from about 0.3 wt. % to about 8 wt. %. The thickness of the activated carbon layer can be equal to or less than 200 micrometers. In another embodiment, the activated carbon layer forms a uniform layer around the core material. In another embodiment, the amount of activated carbon relative to the absorbent granule is from about 0.1 wt. % to about 10 wt. %. In another embodiment the amount of activated carbon relative to the dried absorbent granule is from about 0.2 wt. % to about 5 wt. %.

Representative clumping agents include, for example, bentonite (such as sodium bentonite), guar gums, starches, xanthan gums, gum Arabic, gum acacia, silica gel, and other minerals, and mixtures a mixture thereof. In one embodiment, the clumping agent comprises bentonite. In another embodiment, the clumping agent comprises sodium bentonite. Sodium bentonite is described in the industry as a "swelling" clay because particles of sodium bentonite enlarge in size and volume when they absorb moisture. In addition, sodium bentonite particles exhibit gel-like qualities when wet that promote clumping of the sodium bentonite particles when liquid (such as urine) is applied. In another embodiment, the clumping agent comprises a mixture of sodium bentonite and one or more different clumping agents, for example, a combination of sodium bentonite and guar gum.

Where sodium bentonite is employed as or in the clumping agent layer, the bulk density of the bentonite is typically in the range of 600 to 1125 kg/m$^3$, or 600 kg/m$^3$, 700 kg/m$^3$, 800 kg/m$^3$, 900 kg/m$^3$, 1000 kg/m$^3$, or 1100 kg/m$^3$. In one particular embodiment, for example, the bulk density of the sodium bentonite is approximately 1125 kg/m$^3$ (approximately 70 lb/ft$^3$).

The clumping agent layer that is outward from the activated carbon layer can include one or more other components additional to the clumping agent, such as one or more fillers. Nevertheless, an embodiment of the clumping agent layer consists essentially of bentonite. Generally, bentonite is a naturally occurring combination of clay minerals and some non-clay mineral constituents. Bentonite is rich in montmorillonite but may also include other clay and some non-clay mineral constituents. For example, bentonite can include trace amounts of minerals other than montmorillonite, for example feldspar, quartz, calcite, and/or gypsum.

When the clumping agent comprises bentonite, the bentonite can be applied to the layer of activated carbon as a powder, for example a powder having a size of smaller than 100 mesh US sieve size, for example, 100 mesh to 400 mesh, or 100 mesh to 300 mesh, or 100 mesh to 200 mesh. The bentonite in the clumping agent layer can be from about 20 to about 75 wt. %, about 25 to about 75 wt. %, about 30 to about 75 wt. %, about 40 to about 75 wt. %, about 50 to about 75 wt. %, about 60 to about 75 wt. %, about 65 to about 75 wt. % relative to the weight of the core material.

In an embodiment, the absorbent granules consist essentially of or consist of natural components, and the resultant deodorizer or clumping pet litter consists essentially of or consists of the absorbent granules. The term "natural components" includes chemically synthesized substances that are identical in structure to a naturally-occurring forms of the substance.

Various additives may be optionally included in one or more layers of the granules of absorbent particles coated with activated carbon and then clumping agent. Non-limiting examples of suitable additives include a fragrance, an anti-microbial agent, an anti-sticking agent, an agent for controlling pH, a dye, a coloring agent, a de-dusting agent, a disinfectant, an additional odor control agent, and combinations thereof.

Another aspect of the present disclosure is a clumping pet litter comprising absorbent granules each granule comprising a core of absorbent material, a first distinct layer comprising activated carbon, at least partially coating the core of absorbent material, and a second distinct layer comprising a clumping agent (e.g., bentonite), at least partially coating the first distinct layer comprising the activated carbon. Yet another aspect of the present disclosure is a deodorizer comprising absorbent granules each comprising a core of absorbent material, a first distinct layer comprising activated carbon, at least partially coating the core of absorbent material, and a second distinct layer comprising a clumping agent (e.g., sodium bentonite), at least partially coating the first distinct layer comprising the activated carbon.

The core of absorbent material can be substantially free of activated carbon and/or substantially free of bentonite. The core of absorbent material can comprise one or more clays. Additionally or alternatively, the core of absorbent material can comprise expanded perlite.

The first distinct layer can consist essentially of activated carbon. The second distinct layer can consist essentially of the clumping agent (e.g. sodium bentonite).

Another aspect of the present disclosure is a litter composition comprising the absorbent granules disclosed herein. In some embodiments, the absorbent granules are present in the litter composition in an amount from about 0.5 wt. % to about 100 wt. % relative to the total litter composition. In another embodiment, the absorbent granules are present in the litter composition in an amount from about 0.5 wt. % to about 10 wt. % relative to the total litter composition. In another embodiment, the absorbent granules are present in the litter composition in an amount from about 0.5 wt. % to about 5 wt. % relative to the total litter composition. In another embodiment the absorbent granules are present in the litter composition in an amount of about 0.5 wt. %, about 1.0 wt. %, about 2.0 wt. %, about 3.0 wt. %, about 4.0 wt. %, or about 5.0 wt. %. In some embodiments, the pet litter comprises a combination of the absorbent granules disclosed herein and one or more types of granules having a formulation different from the absorbent granules disclosed herein. In some embodiments, the one or more granules having a formulation different from the absorbent granules disclosed herein comprise clay coated with bentonite. Another aspect of the present disclosure is a sealed package at least partially enclosing any of the embodiments of the absorbent granules disclosed herein, for example a sealed box or a sealed bag containing such absorbent granules as at least a portion of a deodorizer or a clumping pet litter.

A further aspect of the present disclosure is a method of using a pet litter, the method comprising positioning at least a portion of the pet litter into a litter box (e.g., by pouring the deodorizer from the package into the litter box). The method can manage animal waste, such as cat urine; reduce malodor from animal waste; prevent or treat cat out-of-box elimination; or treat or prevent lower urinary tract diseases in a cat, such as urinary plugs, struvite or oxalate stones, idiopathic cystitis, or renal reflux. In an embodiment, one or more of the pet litters disclosed herein are used to treat a cat having an out-of-box elimination issue. As used herein, a cat that has "an out-of-box elimination issue" is a cat that has eliminated outside of the litter box at least once in the last month, and in an embodiment eliminated outside of the litter box at least once in the last week.

Another further aspect of the present disclosure is a method of using a deodorizer, the method comprising positioning at least a portion of the deodorizer into a litter box containing a pet litter that is a composition having a different formulation than the pet deodorizer (e.g., by pouring the deodorizer from the package into the litter box). Additionally or alternatively, at least a portion of the pet deodorizer can be positioned in a location comprising a substance creating the malodor (e.g., by pouring the deodorizer from the package into the litter box), such as a location periodically visited by a pet and/or any location having pet malodors, for example a room of a building that a pet visits at least once daily, such as a room in a house where the pet lives.

EXAMPLES

The following non-limiting examples are illustrative of embodiments of the absorbent granules provided by the present disclosure and advantages thereof.

Example 1

Carboxymethylcellulose sodium salt (CMC), 1.14 g, was gradually added to 568 g of water in a blender under vigorous stirring until a uniform clear solution was formed. The viscosity of this CMC solution was 64 centipoise (cP) as measured by a BROOKFIELD DV-II+ viscometer at ambient temperature (about 25° C.). Then, 22.7 g activated carbon power was gradually added into the CMC solution under vigorous stirring until a uniform carbon slurry was formed. Next, 1.25 lbs of expanded perlite cores were placed in a laboratory rotary coating machine, and then the prepared carbon slurry or suspension was added, followed by addition of 3.75 lbs of dry sodium bentonite powder. The obtained litter material was later dried and sized to −8 to +30 US mesh size. The carbon content in this specific example was 1% by weight of the litter material.

A series of other samples with a perlite core but containing different amount of activated carbon were prepared using similar methods. Two kinds of activated carbon powder were used, the coconut-based carbon (A) and coal-based carbon (B).

The odor control capability of the absorbent granules was evaluated. Absorbent granules containing different amounts of activated carbon prepared as described above and granules without the activated carbon (control) were treated with animal urine and/or fecal matter. After 5 days, each sample was rated on a scale of 0-100 by a sensory panel trained in the identification of aromatics associated with fecal/urine, ammonia, and fragrance, utilizing industry recognized methodology. The results for each sample were averaged. The results are reported in Table 1.

TABLE 1

| Sample | Intensity of Fecal/Urine Smell |
| --- | --- |
| Litter without carbon (control) | 48.78 |
| Litter with 0.5% activated carbon A | 16.74 |
| Litter with 1.0% activated carbon A | 5.99 |
| Litter with 3.0% activated carbon A | 4.12 |
| Litter with 0.5% activated carbon B | 9.2 |
| Litter with 1.0% activated carbon B | 4.08 |
| Litter with 3.0% activated carbon B | 8.46 |

The relative brightness of each sample, prepared using the method above, was measured with a HUNTERLAB COLORFLEX 45/0 colorimeter. A control sample was prepared using an earlier known method in which powder activated carbon was dry mixed with bentonite powder, and then coated on a core of expanded perlite in the absence of a binder. The results are shown in Table 2.

TABLE 2

| | Relative Brightness (%) | | |
| --- | --- | --- | --- |
| Activated Carbon (%) | Layered Granule with Activated Carbon A | Layered Granule with Activated Carbon B | Control |
| 0 | 100 | 100 | 100 |
| 0.5 | 98 | 93 | 84 |
| 1.0 | 97 | 94 | 77 |
| 3.0 | 91 | 84 | 54 |

The data in Table 1 and Table 2 clearly show the advantages of the methods and compositions described herein.

Example 2

In another example, under vigorous stirring, 1.59 g carboxymethylcellulose sodium salt (CMC) was gradually added to 795 g water in a blender until a uniform clear solution was formed. Then, 49.5 g activated carbon power was gradually added into the blender under vigorous stirring until a uniform carbon slurry was formed. Next, 7 lbs of agglomerated clay cores were added into the rotary coating machine to 1500 rpm. Then, the prepared carbon suspension or slurry was added, followed by addition of 3.9 lbs of dry bentonite powder. The obtained absorbent granules were dried and sized to −8 to +30 US mesh size. The absorbent granules were dried as in the example above.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method of making absorbent granules, the method comprising:

mixing activated carbon with a liquid and a binder to form a slurry;

applying the slurry to particles of absorbent core material to at least partially coat the particles of the absorbent core material with a first distinct layer comprising the activated carbon; and applying a clumping agent to the first distinct layer to at least partially coat the first distinct layer with a second distinct layer, wherein the clumping agent comprises sodium bentonite, and wherein the second distinct layer is an outermost layer of the absorbent granules.

2. The method of claim 1, further comprising drying the absorbent granules to form dried granules.

3. The method of claim 2, further comprising separating a portion of the dried granules from the remainder of the dried granules, wherein the portion has sizes within a predetermined size range.

4. The method of claim 1, wherein the second distinct layer consists essentially of the sodium bentonite.

5. The method of claim 1, wherein the first distinct layer consists essentially of the activated carbon.

6. The method of claim 1, wherein the absorbent core material consists essentially of at least one of a clay or expanded perlite.

7. The method of claim 1, wherein the absorbent core material is an agglomerate that comprises clay and is substantially free of activated carbon and substantially free of bentonite.

8. The method of claim 1, wherein the binder comprises a hydrocolloid.

9. The method of claim 1, wherein at least one step selected from the group consisting of the applying of the slurry to the particles of the absorbent core material and the applying of the clumping agent to the first distinct layer is performed in a rotary coating machine.

10. The method of claim 1, comprising first mixing the binder in the liquid to form a solution and then adding a powder comprising the activated carbon to the solution with stirring to produce the slurry.

11. The method of claim 1, wherein the clumping agent is applied to the first distinct layer as a powder.

12. Absorbent granules each comprising an absorbent core, a first distinct layer comprising activated carbon, and a second distinct layer comprising a clumping agent comprising sodium bentonite, the first distinct layer is between an outer surface of the absorbent core and an inner surface of the second distinct layer, wherein the second distinct layer is an outermost layer of the absorbent granules.

13. The absorbent granules of claim 12, wherein the second distinct layer consists essentially of the sodium bentonite.

14. The absorbent granules of claim 12, wherein the first distinct layer consists essentially of the activated carbon.

15. The absorbent granules of claim 12, wherein the absorbent core consists essentially of at least one of a clay or expanded perlite.

16. The absorbent granules of claim 12, wherein the absorbent core is an agglomerate that comprises clay and is substantially free of activated carbon and substantially free of bentonite.

17. The absorbent granules of claim 12, further comprising a binder that adheres the activated carbon to the absorbent core.

18. A clumping pet litter comprising the absorbent granules of claim 12.

* * * * *